(12) United States Patent
Shahriari et al.

(10) Patent No.: US 11,420,638 B2
(45) Date of Patent: Aug. 23, 2022

(54) SYSTEM AND METHOD FOR LEARNING DRIVER PREFERENCE AND ADAPTING LANE CENTERING CONTROLS TO DRIVER BEHAVIOR

(71) Applicant: GM GLOBAL TECHNOLOGY OPERATIONS LLC, Detroit, MI (US)

(72) Inventors: Mohammadali Shahriari, Markham (CA); Amir Takhmar, Toronto (CA); Reza Zarringhalam, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 16/738,453

(22) Filed: Jan. 9, 2020

(65) Prior Publication Data

US 2021/0213959 A1 Jul. 15, 2021

(51) Int. Cl.
*B60W 40/09* (2012.01)
*B60W 30/12* (2020.01)
*G05D 1/00* (2006.01)
*G05D 1/02* (2020.01)

(52) U.S. Cl.
CPC ............ *B60W 40/09* (2013.01); *B60W 30/12* (2013.01); *G05D 1/0088* (2013.01); *G05D 1/0214* (2013.01); *G05D 1/0221* (2013.01); *B60W 2520/125* (2013.01)

(58) Field of Classification Search
CPC ............... B60W 40/09; B60W 30/12; B60W 2520/125; G05D 1/0088; G05D 1/0214; G05D 1/0221
See application file for complete search history.

(56) References Cited

U.S. PATENT DOCUMENTS

2017/0061812 A1* 3/2017 Lahav ............... G09B 9/042
2018/0113461 A1* 4/2018 Potnis ............... B60W 50/00

* cited by examiner

*Primary Examiner* — Ramsey Refai
(74) *Attorney, Agent, or Firm* — Cantor Colburn LLP (57) ABSTRACT

A vehicle and a system and method of operating a vehicle. The system includes a processor. The processor learns a driver's behavior of a driver of the vehicle as the driver navigates a road segment, creates a behavior policy based on the driver's behavior and a threshold associated with the road segment, and controls the vehicle to navigate the road segment using the behavior policy.

17 Claims, 7 Drawing Sheets

SYSTEM AND METHOD FOR LEARNING DRIVER PREFERENCE AND ADAPTING LANE CENTERING CONTROLS TO DRIVER BEHAVIOR

INTRODUCTION

The subject disclosure relates to vehicle navigation and, in particular, to a system and method for adapting a behavior of an autonomous vehicle to a behavior of a driver of the vehicle.

An autonomous vehicle or semi-autonomous vehicle is able to navigate roads and highways according to a pre-determined behavior. The exact behavior of the autonomous vehicle will most likely differ from the behavior of the vehicle when driven by a person behind the wheel. For example, the autonomous vehicle will often navigate a curve by maintaining itself midway between an outer edge and an inner edge of the curve, while a driver may hug either the outer edge or inner edge. It is desirable however that the driver be comfortable with the way the autonomous vehicle behaves. Accordingly, it is desirable to train an autonomous vehicle to adapt its behavior to imitate that of the driver.

SUMMARY

In one exemplary embodiment, a method of operating a vehicle is disclosed. A driver's behavior of a driver of the vehicle is learned at a processor as the driver navigates a road segment. A behavior policy is created at the processor based on the driver's behavior and a threshold associated with the road segment. The processor controls the vehicle to navigate the road segment using the behavior policy.

In addition to one or more of the features described herein, a knowledge matrix is constructed by learning the driver's behavior for a plurality of navigations of the road segment, selecting an action from the knowledge matrix based on an environment state and creating the behavior policy based on the selected action. The knowledge matrix is based on at least one of the environmental state, a vehicle state, and a driver state. Learning the driver's behavior further includes measuring at least one of a vehicle speed selected by the driver, a lateral control of the vehicle selected by the driver, and an acceleration or deceleration of the vehicle selected by driver when the driver navigates the vehicle over the road segment. In an embodiment, the threshold associated with the road segment includes a safety limit of the road segment, and creating the behavior policy includes modifying the learned driver's behavior based on the safety limit of the road segment. The driver's behavior includes at least one of the driver's behavior within a lane of the road segment, and the driver's behavior for changing lanes in the road segment. The method further includes learning the driver's behavior in one of an offline learning mode in which the vehicle is driven by the driver and an online learning mode in which the vehicle is controlled by the processor as the driver operates a control of the vehicle.

In another exemplary embodiment, a system for operating a vehicle is disclosed. The system includes a processor configured to learn a driver's behavior of a driver of the vehicle as the driver navigates a road segment, create a behavior policy based on the driver's behavior and a threshold associated with the road segment, and control the vehicle to navigate the road segment using the behavior policy.

In addition to one or more of the features described herein, the processor is further configured to construct a knowledge matrix by learning the driver's behavior for a plurality of navigations of the road segment, select an action from the knowledge matrix based on an environment state and create the behavior policy based on the selected action. The knowledge matrix is based on at least one of the environmental state, a vehicle state, and a driver state. The processor is further configured to learn the driver's behavior by measuring at least one of a vehicle speed selected by the driver, a lateral control of the vehicle selected by the driver, and an acceleration or deceleration of the vehicle selected by the driver when the driver navigates the vehicle over the road segment. The threshold associated with the road segment includes a safety limit of the road segment, and the processor is configured to create the behavior policy by modifying the learned driver's behavior based on the safety limit of the road segment. In an embodiment, the system further includes an electronics package transferable to and from the vehicle. The processor is further configured to learn the driver's behavior in one of an offline learning mode in which the vehicle is driven by the driver and an online learning mode in which the vehicle is controlled by the processor as the driver operates a control of the vehicle.

In yet another exemplary embodiment, a vehicle is disclosed. The vehicle includes a processor. The processor is configured to learn a driver's behavior of a driver of the vehicle as the driver navigates a road segment, create a behavior policy based on the driver's behavior and a threshold associated with the road segment, and control the vehicle to navigate the road segment using the behavior policy.

In addition to one or more of the features described herein, the processor is further configured to construct a knowledge matrix by learning the driver's behavior for a plurality of navigations of the road segment, select an action from the knowledge matrix based on an environment state and create the behavior policy based on the selected action. The vehicle further includes an additional processor that is transferable to and from the vehicle, the additional processor configured to modify a path planning command based on the learned driver's behavior and/or to adapt a lane centering control command to the learned-driver-behavior. The processor is further configured to learn the driver's behavior by measuring at least one of a vehicle speed selected by the driver, a lateral control of the vehicle selected by the driver, and an acceleration or deceleration of the vehicle selected by the driver when the driver navigates the vehicle over the road segment. The threshold associated with the road segment includes a safety limit of the road segment, and the processor is configured to create the behavior policy by modifying the learned driver's behavior based on the safety limit of the road segment. The processor is further configured to learn the driver's behavior in one of an offline learning mode in which the vehicle is driven by the driver and an online learning mode in which the vehicle is controlled by the processor as the driver operates a control of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
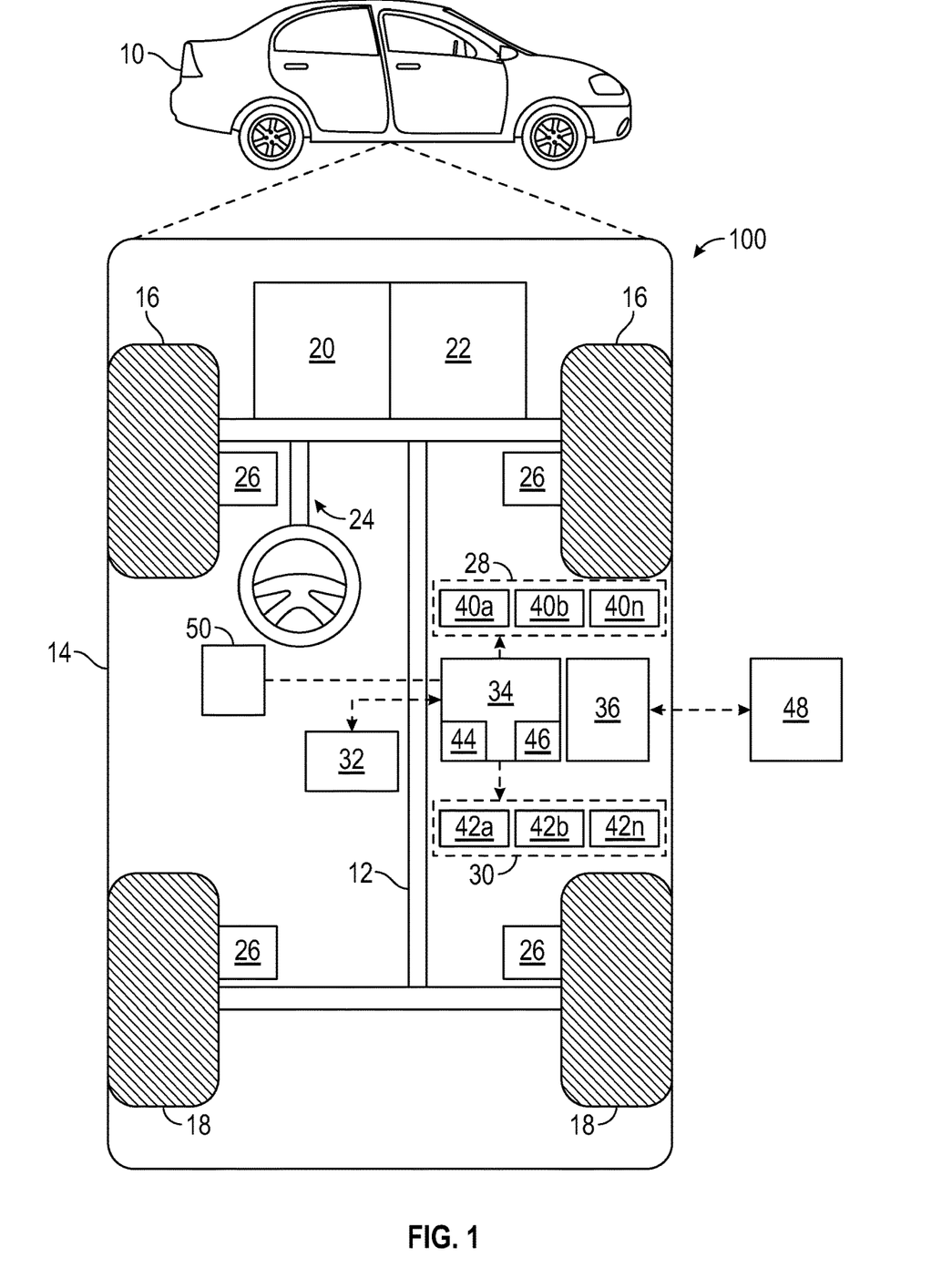
FIG. 1 shows a vehicle in accordance with an exemplary embodiment.

In accordance with an exemplary embodiment, FIG. 1 shows a vehicle 10. In an exemplary embodiment, the vehicle 10 is a semi-autonomous or autonomous vehicle. In various embodiments, the vehicle 10 includes at least one driver assistance system for both steering and acceleration/deceleration using information about the driving environment, such as cruise control and lane-centering. While the driver can be disengaged from physically operating the vehicle 10 by having his or her hands off the steering wheel and foot off the pedal at the same time, the driver must be ready to take control of the vehicle.

In general, a trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near respective corners of the body 14.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors for observing and measuring parameters of the exterior environment. The sensing devices 40a-40n may further include brake sensors, steering angle sensors, wheel speed sensors, etc. for observing and measuring in-vehicle parameters of the vehicle. The cameras can include two or more digital cameras spaced at a selected distance from each other, in which the two or more digital cameras are used to obtain stereoscopic images of the surrounding environment in order to obtain a three-dimensional image. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as air, music, lighting, etc. (not numbered).

The at least one controller 34 includes at least one processor 44 and a computer readable storage device or media 46. The at least one processor 44 can be any custom made or commercially available processor, a central processing unit (CPU), a graphics processing unit (GPU), an auxiliary processor among several processors associated with the at least one controller 34, a semiconductor-based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the at least one processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the at least one controller 34 in controlling the vehicle 10.

The instructions may include one or more separate programs, each of which comprises an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller is shown in FIG. 1, embodiments of the vehicle 10 can include any number of controllers that communicate over any suitable communication medium or a combination of communication mediums and that cooperate to process the sensor signals, perform logic, calculations, methods, and/or algorithms, and generate control signals to automatically control features of the vehicle 10.

The method disclosed herein operates a vehicle autonomously according to a learned behavior or behavior policy that is based on observations of a driver's behavior. In one embodiment, the method disclosed herein can be performed on the processor 44. In an alternate embodiment, a separate driving behavior system 50 can be affixed to the vehicle and communicatively coupled with vehicle electronics such as processor 44. The driver behavior system 50 performs the methods for autonomous driving of the vehicle by observing the driver's behavior and basing its behavior policy for autonomous driving on the driver's behavior. In various embodiments, the driver behavior system 50 modifies a path planning command based on the learned driver's behavior and/or adapts a lane centering control command to the learned-driver's behavior. The driver behavior system 50 can be an electronics package, or processor that can be added to or removed from the vehicle 10 as desired and is transferrable to and from the vehicle.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
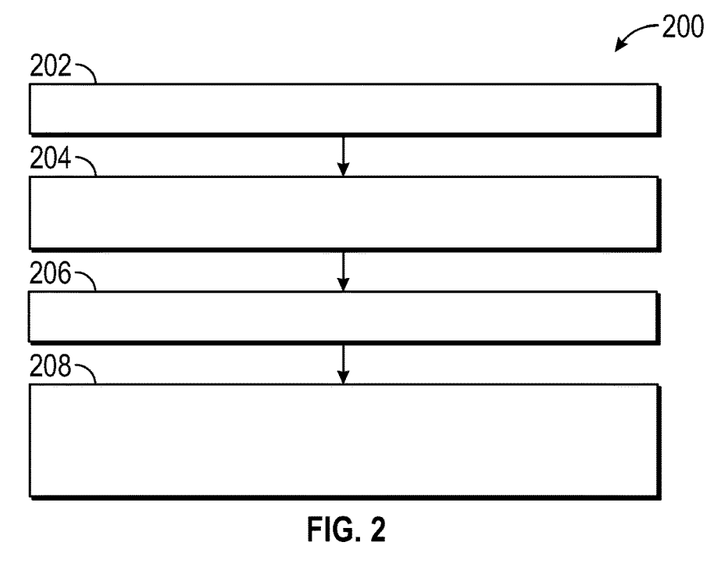
FIG. 2 shows a flowchart illustrating a method for training a vehicle to navigate a road segment with a behavior that imitates the behavior of a selected driver.

FIG. 2 shows a flowchart 200 illustrating a method for training a vehicle to navigate a road segment with a behavior that imitates the behavior of a selected driver. A driver's behavior is characterized by how the driver navigates a particular road segment or type of road segment. The driver's behavior over a road segment can be quantified by various parameters, such as a speed or average speed of the vehicle being driven, the relative location of the vehicle within the lane (i.e., centered, to the left, to the right), etc. For a vehicle changing lanes, the driver's behavior can be quantified by how abruptly or smoothly the driver changes lanes, varies speed, etc. The driver's behavior can be determined by recording the driver's speed, lateral control or steering commands, etc. at the various sensing devices 40a-40n of the vehicle.

In box 202, an environmental state of the vehicle is determined. The environmental state of the vehicle can be based on a geometry of the road or road segment being traversed or navigated by the vehicle, a presence of obstacles as well as their relative locations and speeds, etc. In box 204, the vehicle learns a driver's behavior for the environmental state as the driver navigates the vehicle over the road segment. The driver's behavior includes a vehicle speed and lateral control, etc. In box 206, the learned behavior is used to build up or construct a knowledge base for the driver. In box 208, the autonomous vehicle subsequently drives over the road segment using a behavior policy based on the knowledge matrix.

The driver's behavior can be learned offline or online. In an offline learning mode, the processor 44 records the driver's behavior while the driver is in complete control of the vehicle, (i.e., no autonomous driving modes are activated). In an online learning mode, the processor 44 operates the vehicle according to its pre-determined driving behavior, while the driver is simultaneously operating the steering wheel. The processor 44 records any differences between the driver's behavior and the behavior of the autonomous vehicle and adapts the behavior of the vehicle ("vehicle behavior") to that of the driver, within safe and stable driving behavior limits.

While described herein as learning a driving behavior of a single driver, the processor 44 can also identify a driver using data from a suitable identification sensor associated with the vehicle. The processor 44 can thereby learn the driving behavior of multiple drivers and can change its behavior to accommodate the driving behavior of the driver currently behind the wheel.

Figure 3:
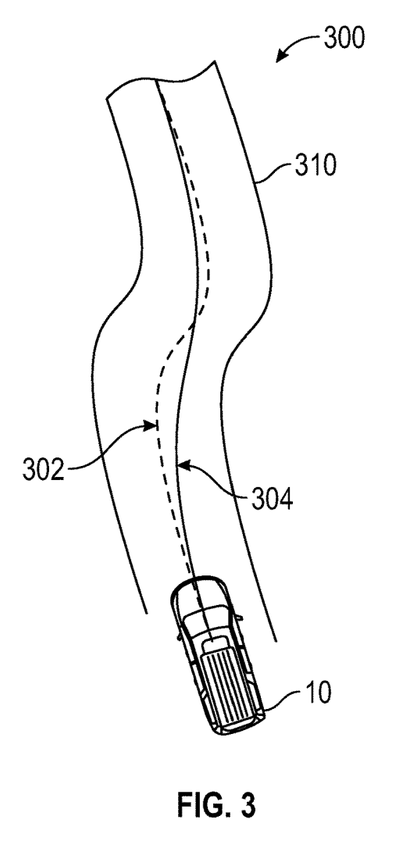
FIG. 3 shows a top view of a road segment including a curved portion.

FIG. 3 shows a top view 300 of a road segment 310 including a curved portion. The top view 300 shows a vehicle 10 and a lane-centering control trajectory 302 that is selected by the autonomous vehicle 10 to navigate the road segment 310 by maintaining the vehicle 10 in the center of the lane, particularly over the curved portion. Also shown is a driver's desired trajectory 304 that is taken by the driver over the road segment 310. The driver's desired trajectory 304 hugs the inner edges of the curve over the curved portion of the road segment. The difference between the lane-centering control trajectory 302 and the driver's desired trajectory 304 is recorded in order to learn the driver's behavior.

Figure 4:
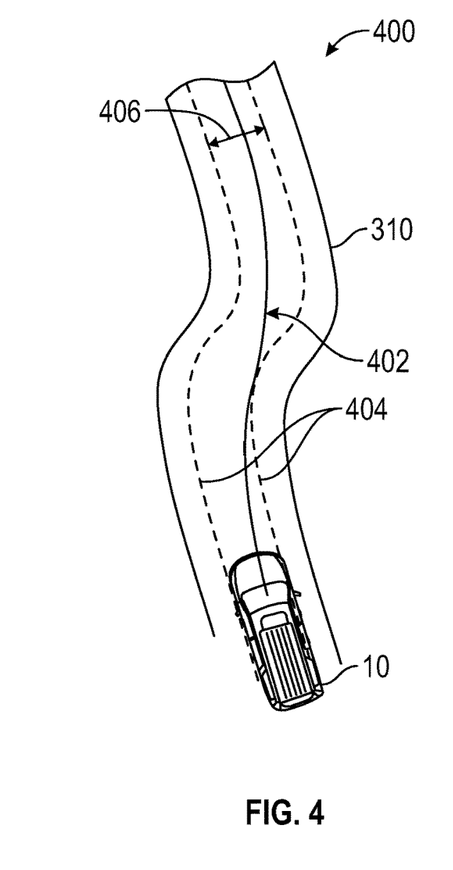
FIG. 4 shows a top view of the road segment of FIG. 3.

FIG. 4 shows a top view 400 of the road segment 310 of FIG. 3. The top view 400 shows an updated lane centering control trajectory 402 that is based on a learning algorithm applied to the driver's desired trajectory 304 of FIG. 3. The updated lane centering control trajectory 402 deviates from the lane-centering control trajectory 302 of FIG. 3 in order to be more aligned with the driver's desired trajectory 304. The updated lane centering control trajectory 402 lies within safety limits 404 for the road segment set by the processor, which define a width of the road segment 310 that is safely away from edges of the road segment. The updated lane centering control trajectory 402 is based on modifying the driver's desired trajectory to lie within the safety limits 404 of the road segment. The safety limits can define a road section boundary, a maximum vehicle speed, a maximum acceleration or deceleration within the road segment, etc. In an embodiment in which an updated lane centering control trajectory 402 is limited by the safety limits 404, the updated lane centering control trajectory 402 does not completely imitate the driver's desired trajectory 304.

Figure 5A:
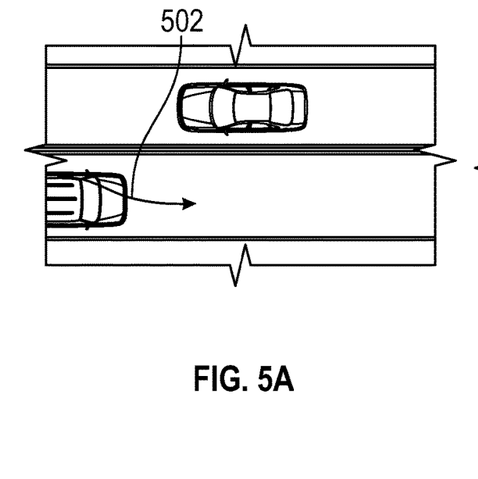
FIGS. 5A-5E illustrate various driving behaviors that can be exhibited by a driver.
Figure 5B:
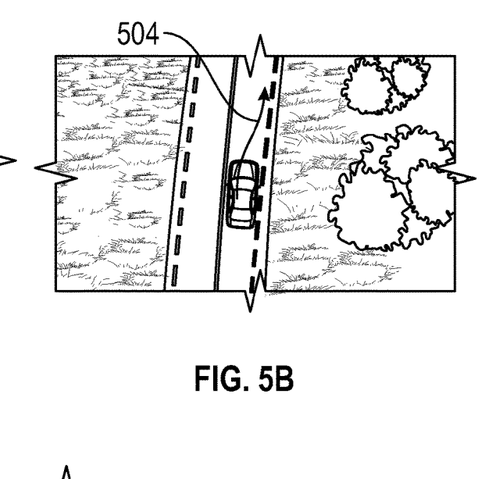
Figure 5C:
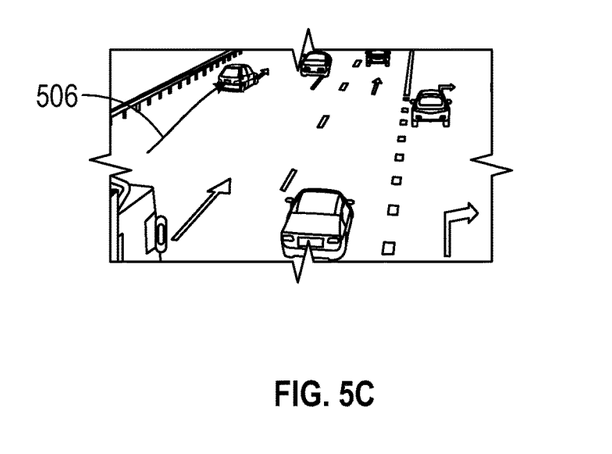
Figure 5D:
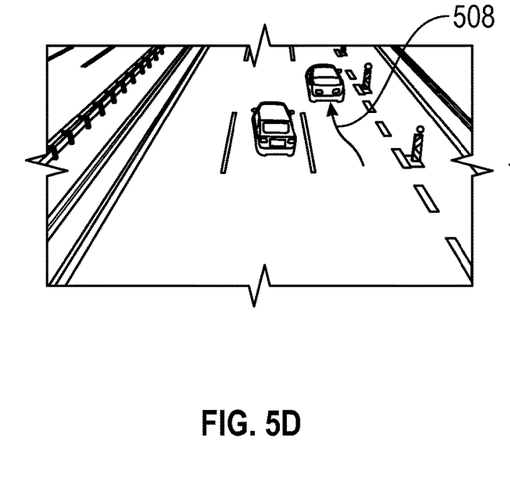
Figure 5E:
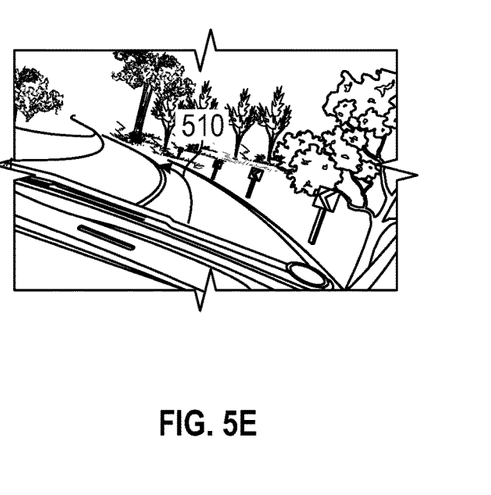

FIGS. 5A-5E illustrate various driving behaviors that can be exhibited by a driver. FIG. 5A illustrates a driver in a lane adjacent to a lane of oncoming traffic. The driver veers temporarily to one side (i.e., the right side) of the vehicle lane as a remote vehicle is approaching in the oncoming lane (as indicated by arrow 502) in order to place distance between the vehicle and the remote vehicle. FIG. 5B shows a vehicle along a rural road, with the driver tending to drive offset to one side of the lane (i.e., the outside of the lane, as indicated by arrow 504). FIG. 5C shows a multi-lane road with a vehicle in a far-left lane of the multi-lane road hugging the side barrier of the lane (as indicated by arrow 506). FIG. 5D show a lane with cones in an adjacent lane and a vehicle maneuvering to a side of the lane to get away from the cones (as indicated by arrow 508). FIG. 5E illustrates a vehicle along a curved section of a roadway. Some drivers may tend to hug an inside of the curve while other drivers may tend to hug an outside of the curve (as indicated by arrow 510).

Figure 6:
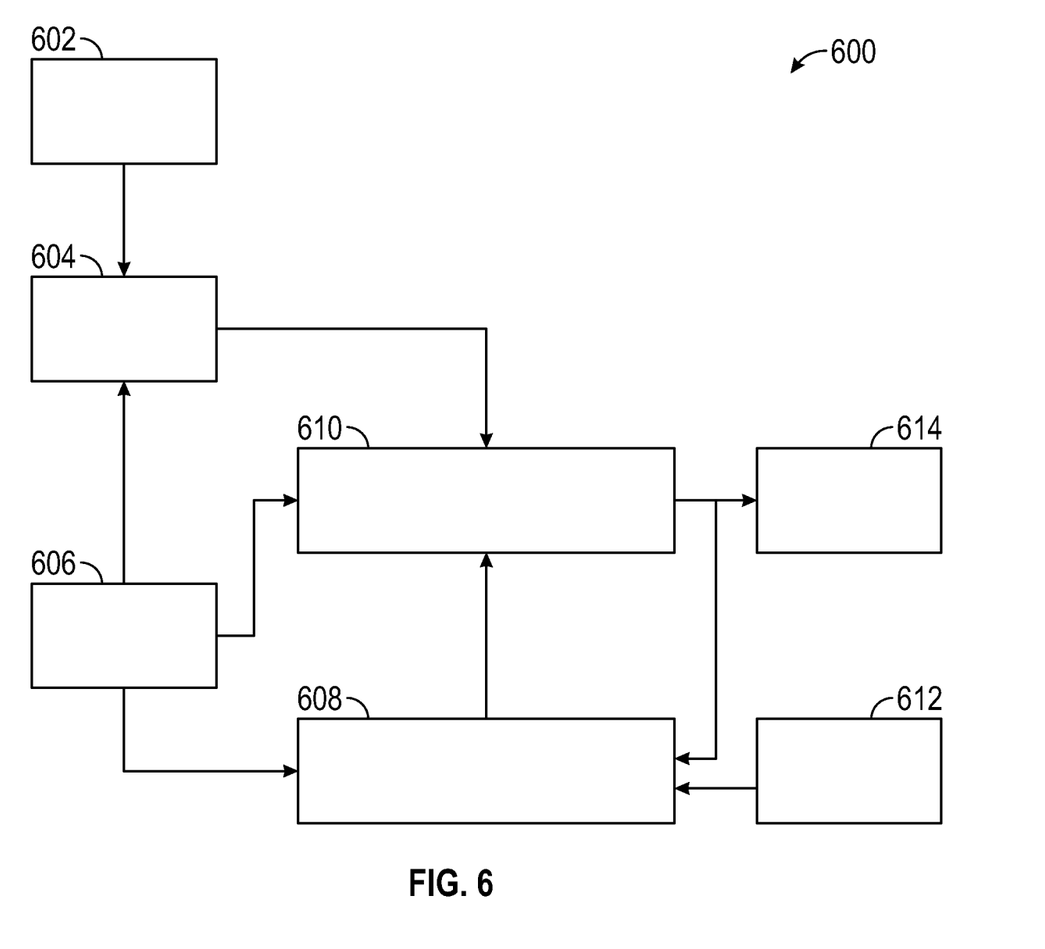
FIG. 6 shows a schematic diagram of a behavior learning and modification system suitable for learning a driver's behavior and operating the autonomous vehicle so as to imitate the driver's behavior.

FIG. 6 shows a schematic diagram of a behavior learning and modification system 600 suitable for learning a driver's behavior and operating the autonomous vehicle so as to imitate the driver's behavior. The system 600 includes a sensor module 602, vehicle and environment module 604 and a path planning module 606. The sensor module 602 includes various cameras, Lidar, radar or other sensors for determining the state of the surroundings of the vehicle with respect to the road, as well as the location of remote vehicles, pedestrians, obstacles, etc. The vehicle and environment module 604 provides data from the environment such as a road geometry, a location, speed and orientation of vehicles and other obstacles in the environment etc. The data from the sensor module 602 and the vehicle and environment module 604 is provided to the path planning module 606 which plans a selected path or trajectory for the autonomous vehicle.

The system 600 further includes a learning module 608 and an adaptive control module 610 for learning the behavior of the driver and implementing the learned behavior at the vehicle. The learning module 608 receives driver steering signal from a steering or control sensor 612, a steering signal taken by the vehicle from the adaptive control module 610 as well as state data $S_i$ from the vehicle and environment module 604. The state data $S_i$ for an $i^{th}$ road segment can be as shown in Eq. (2):

$$S_i = [S_{p,i}\ S_{\rho,i}\ S_{\dot{\rho},i}] \qquad \text{Eq. (1)}$$

where $S_{p,i}$ is a position state, $S_{\rho,i}$ is a curvature of the road state and $S_{\dot{p},i}$ is a change rate of the curvature of the road state.

By comparing the driver input to the current trajectory for the current state data $S_i$, the learning module 608 determines a reward $P(i,j)$ for the autonomous vehicle. The reward $P(i,j)$ quantifies an agreement or lack of agreement between vehicle trajectory and driver trajectory. The learning module 608 updates a knowledge matrix $Q(i,j)$ based on the determined reward as given by the following equation:

$$Q(i,j) = \alpha P(i,j) + (1-\alpha)Q(i,j) \qquad \text{Eq. (2)}$$

\where $\alpha$=a user-selected learning rate for updating the knowledge matrix.

The adaptive control module 610 receives a planned trajectory from the path planning module 606, state data $S_i$ from the vehicle and environment module 604, and a best action policy $A_j$ from the learning module 608. The best action policy $A_j$ is derived from the knowledge matrix $Q(i,j)$. The knowledge matrix is built upon monitoring various actions $A_j$ for a plurality of states $S_i$:

$$Q = \begin{array}{c} \\ A_1 \\ \vdots \\ A_m \end{array} \begin{bmatrix} S_1 & \cdots & S_n \\ Q_{11} & \cdots & Q_{n1} \\ \vdots & \ddots & \vdots \\ Q_{1m} & \cdots & Q_{nm} \end{bmatrix} \qquad \text{Eq. (3)}$$

The adaptive control module 610 calculates a behavior policy that includes steering signal $\delta_u$ based on the input data. The steering signal $\delta_u$ can be indicated by the following equation:

$$\delta_u = K(\delta_q) \cdot e \qquad \text{Eq. (4)}$$

where K is a matrix of entries that are functions of $\delta_q$. In an alternate embodiment, the behavior policy and steering signal $\delta_u$ are given by Eq. (5):

$$\delta_u = K \cdot e + \delta_q \qquad \text{Eq. (5)}$$

where K is a design parameter for lane following control, and e is a predictive error based on various parameter, such as the vehicle's lateral position and heading, road curvature, a control input, the driver's input, the learned control input, a desired road wheel angle, a controller torque and a driver torque. The driver input torque $\delta_q$ is a function of the selected action:

$$\delta_q = f(A_j) \qquad \text{Eq. (6)}$$

The adaptive control module 610 provides the behavior policy and steering signal $\delta_u$ to the steering module 614 as well as to the learning module 608. The steering module 614 steers the vehicle using the behavior policy and steering signal.

Figure 7:
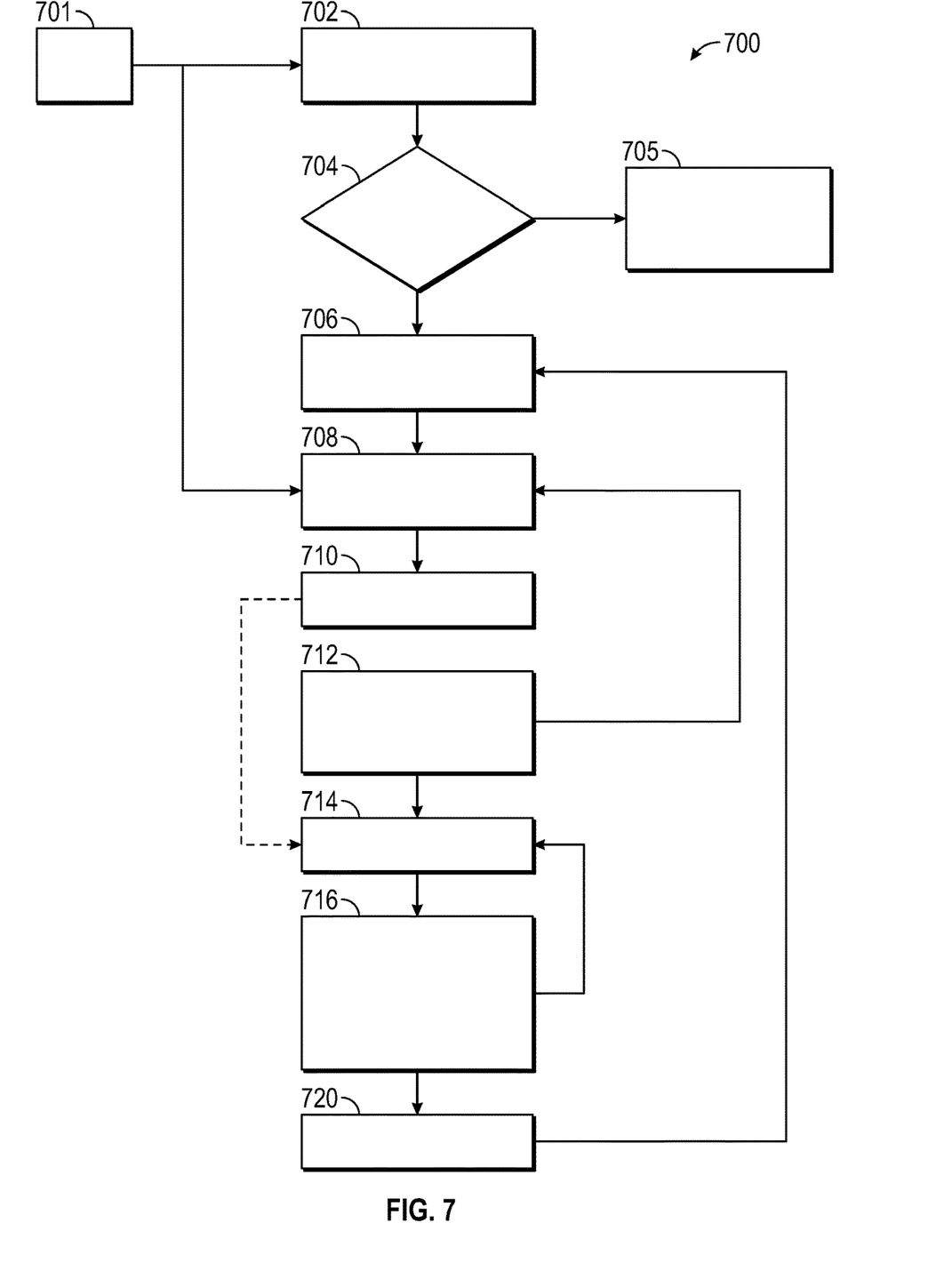
FIG. 7 shows a flowchart illustrating a method by which the system learns the behavior of a driver and subsequently navigates the vehicle based on the learned behavior.

FIG. 7 shows a flowchart 700 illustrating a method by which the system 600 learns the behavior of a driver and subsequently navigates the vehicle based on the learned behavior.

In box 701, a driver's action or input is received. In box 702, the driver's behavior is quantified based on the driver's action or input, as signified by vector q. In box 704, the system 600 evaluates whether the driver's behavior is to be used for learning purposes. When q is greater than or equal to a selected threshold value, the method proceeds to box 705 where the driver's behavior is not used for learning and is used only for driving the vehicle. However, when q<threshold, the system 600 learns from the driver's behavior.

In box 706, the environment state and a corresponding action to be taken by the vehicle is estimated. In box 708, a reward function $P(i,j)$ is calculated based on the estimated state and action. At box 708 the driver's input and a road awareness is received from box 712 and the estimated action of the vehicle is received from box 706. The reward function $P(i,j)$ is calculated based on this input. In box 710 a knowledge matrix $Q(i,j)$ is updated based on the calculated reward and the desired learning rate.

In box 714, a policy $A_j$ is selected form the knowledge matrix determined in box 710 and an environment state from box 712. The policy and environment state are used to calculate an action for navigating the vehicle.

In box 716 a stability check for the selected action is performed in order to ensure that the action lies within safe driving requirements. If the action performed by the selected policy is greater than a safety threshold, then the method returns to box 714 in order to obtain an updated action. If the action performed by the selected policy is within the safety threshold, then the method proceeds to box 720. At box 720, the control action (and hence the behavior policy) is applied to the vehicle.

Figure 8:
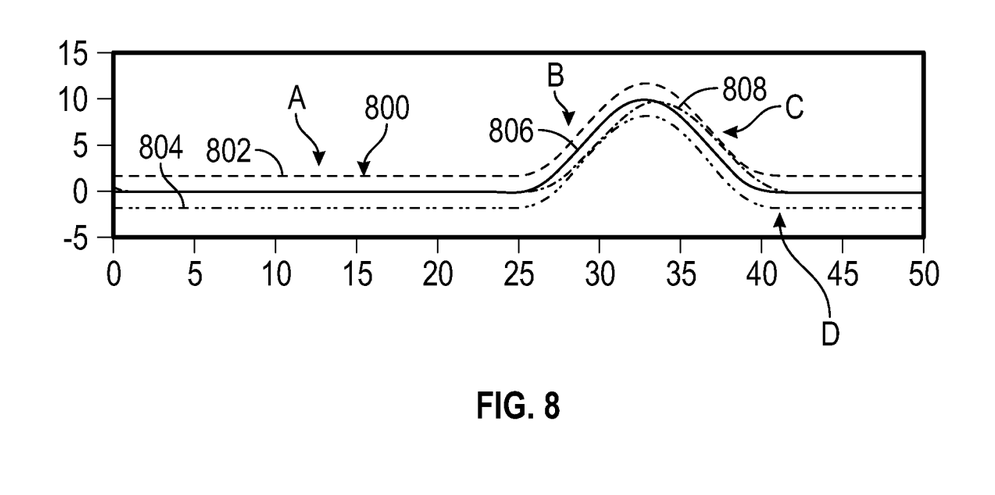
FIG. 8 shows a top view of a roadway illustrating a learning operation of the autonomous vehicle.

FIG. 8 shows a top view of a roadway 800 illustrating a learning operation of the autonomous vehicle. The roadway 800 includes a left lane marker 802 and a right lane marker 804. A first segment (segment A) of the roadway 800 extends in a straight line for about 25 meters. At about x=25 meters, the roadway 800 turns left and continues straight along a second segment (segment B). At about x=32.5 meters, the roadway 800 turns right and continues straight along a third segment (segment C). At about x=40 meters, the roadway 800 turns left again and continues straight along a fourth segment (segment D). Segment D travels in the same direction as Segment A.

A first vehicle trajectory 806 selected by the autonomous vehicle is shown to maintain an equal distance between the left lane marker 802 and the right lane marker 804 over all segments of the roadway 800. A second vehicle trajectory 808 selected by a driver of the vehicle is shown to stay in the center of the lane for Segment A. However, in Segment B, the second vehicle trajectory strays from the center toward the right lane marker 804. In Segment C, the second vehicle trajectory strays towards the left lane marker 802. In Segment D, the second vehicle trajectory is back in the center of the lane.

Figure 9:
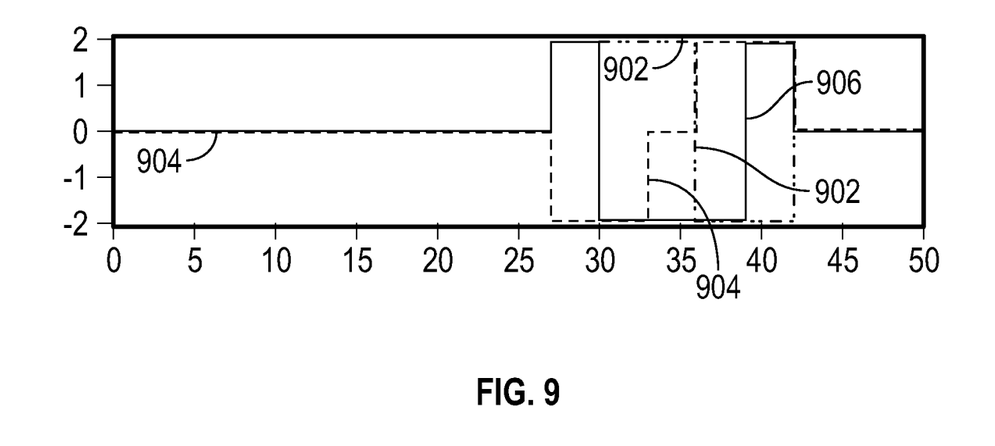
FIG. 9 shows a classification of the road and environmental factor for the roadway of FIG. 8.

FIG. 9 shows a classification of the road and environmental factor for the roadway 800 of FIG. 8. A position error state 902 is recorded between the path of the autonomous vehicle and the path of the driver. A curvature state 904 of the roadway 800 is also recorded as well as a curvature rate of change state 906 for the roadway 800. These position error state 902, curvature state 904, and curvature rate of change state 906 are respective components of the state variable of Eq. (1).

Figure 10:
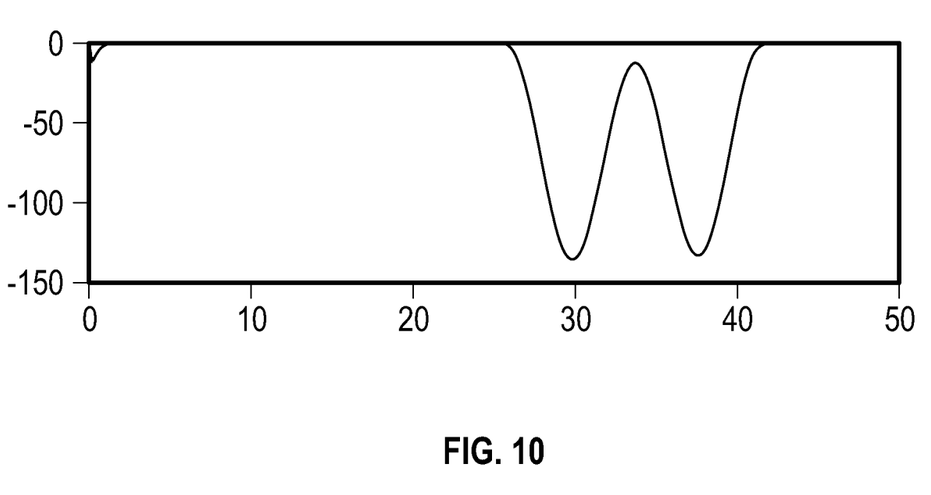
FIG. 10 shows a reward profile that can be quantified over the roadway of FIG. 8.

FIG. 10 shows a reward profile that can be quantified over the roadway 800 of FIG. 8. The reward profile shows a maximum reward over segments in which the driver's trajectory and the vehicle selected trajectory are the same (i.e., straight segment A and segment D). The reward profile decreases over the roadway segments where the driver's selected trajectory differs from the vehicle's selected trajectory (i.e., segment B and segment C)

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a vehicle, comprising:
   navigating the vehicle over a road segment using a driving behavior of the vehicle;
   receiving, at a processor, a driver's behavior of a driver of the vehicle for the road segment as the vehicle navigates the road segment;
   constructing a knowledge matrix by learning the driver's behavior for a plurality of navigations of the road segment;
   creating, at the processor, a reward function based on a difference between the driver's behavior and the driving behavior of the vehicle;
   updating, at the processor, the knowledge matrix based on the reward function;
   selecting, at the processor, the behavior policy from the updated knowledge matrix; and
   controlling, via a processor, the vehicle to navigate the road segment using the behavior policy.

2. The method of claim 1, wherein the knowledge matrix is based on at least one of the environmental state, a vehicle state, and a driver state.

3. The method of claim 1, wherein learning the driver's behavior further comprises measuring at least one of a vehicle speed selected by the driver, a lateral control of the vehicle selected by the driver, and an acceleration or deceleration of the vehicle selected by driver when the driver navigates the vehicle over the road segment.

4. The method of claim 1, wherein the threshold associated with the road segment includes a safety limit of the road segment and creating the behavior policy includes modifying the learned driver's behavior based on the safety limit of the road segment.

5. The method of claim 1, wherein the driver's behavior further comprises at least one of: the driver's behavior within a lane of the road segment; and the driver's behavior for changing lanes in the road segment.

6. The method of claim 1, further comprising learning the driver's behavior in one of an offline learning mode in which the vehicle is driven by the driver and an online learning mode in which the vehicle is controlled by the processor as the driver operates a control of the vehicle.

7. A system for operating a vehicle, comprising:
   a processor configured to:
   navigate the vehicle over a road segment using a driving behavior of the vehicle;
   receive input of a driver's behavior for navigating the vehicle over a road segment as the vehicle navigates the road segment;
   construct a knowledge matrix by learning the driver's behavior for a plurality of navigations of the road segment;
   create a reward function based on a difference between the driver's behavior and the driving behavior of the vehicle;
   update the knowledge matrix based on the reward function;
   select the behavior policy from the updated knowledge matrix; and
   control the vehicle to navigate the road segment using the behavior policy.

8. The system of claim 7, wherein the knowledge matrix is based on at least one of the environmental state, a vehicle state, and a driver state.

9. The system of claim 7, wherein the processor is further configured to learn the driver's behavior by measuring at least one of a vehicle speed selected by the driver, a lateral control of the vehicle selected by the driver, and an acceleration or deceleration of the vehicle selected by the driver when the driver navigates the vehicle over the road segment.

10. The system of claim 7, wherein the threshold associated with the road segment includes a safety limit of the road segment, and the processor is configured to create the behavior policy by modifying the learned driver's behavior based on the safety limit of the road segment.

11. The system of claim 7, further comprising an electronics package transferable to and from the vehicle.

12. The system of claim 7, wherein the processor is further configured to learn the driver's behavior in one of an offline learning mode in which the vehicle is driven by the driver and an online learning mode in which the vehicle is controlled by the processor as the driver operates a control of the vehicle.

13. A vehicle, comprising:
   a processor configured to:
   navigate the vehicle over a road segment using a driving behavior of the vehicle;

receive input of a driver's behavior of a driver of the vehicle as for the road segment as the vehicle navigates the road segment;

construct a knowledge matrix by learning the driver's behavior for a plurality of navigations of the road segment;

create a reward function based on a difference between the driver's behavior and the driving behavior of the vehicle;

update the knowledge matrix based on the reward function;

select the behavior policy from the updated knowledge matrix; and control the vehicle to navigate the road segment using the behavior policy.

14. The vehicle of claim 13, further comprising an additional processor that is transferable to and from the vehicle, the additional processor configured to perform at least one of: (i) modifying the path planning commands based on the learned driver's behavior; and (ii) adapting a lane centering control command to the learned-driver-behavior.

15. The vehicle of claim 13, wherein the processor is further configured to learn the driver's behavior by measuring at least one of a vehicle speed selected by the driver, a lateral control of the vehicle selected by the driver, and an acceleration or deceleration of the vehicle selected by the driver when the driver navigates the vehicle over the road segment.

16. The vehicle of claim 13, wherein the threshold associated with the road segment includes a safety limit of the road segment, and the processor is configured to create the behavior policy by modifying the learned driver's behavior based on the safety limit of the road segment.

17. The vehicle of claim 13, wherein the processor is further configured to learn the driver's behavior in one of an offline learning mode in which the vehicle is driven by the driver and an online learning mode in which the vehicle is controlled by the processor as the driver operates a control of the vehicle.

* * * * *